Oct. 20, 1959  B. L. BURNS  2,909,045
COUPLING
Filed July 26, 1957
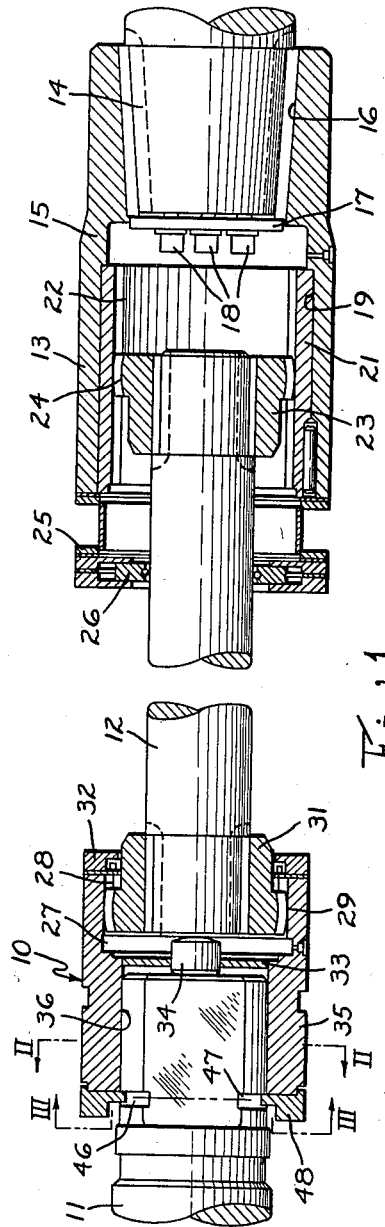
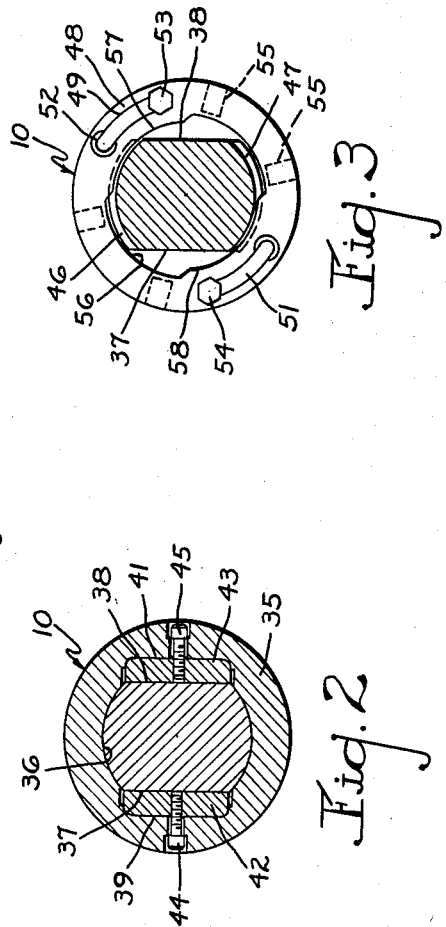
INVENTOR.
Bernard L. Burns
BY
Norman S. Blodgett
Attorney United States Patent Office 2,909,045
Patented Oct. 20, 1959

2,909,045

COUPLING

Bernard L. Burns, Worcester, Mass., assignor to Morgan Construction Company, Worcester, Mass., a corporation of Massachusetts Application July 26, 1957, Serial No. 674,490

7 Claims. (Cl. 64—9)

This invention relates to a coupling and more particularly to a coupling for use with a spindle of the type used in rolling mills to connect the pinion shaft with the roll necks.

In rolling practice, it is the usual practice to join the pinion shaft with the roll neck by means of a drive spindle. It is necessary, of course, to provide a coupling between each end of the spindle and the respective pinion shaft or roll neck, and because of the usual misalignment this coupling must be of a universal type. The coupling which is associated with the roll neck must be constructed so as to be readily removable therefrom. Such removal of the coupling from the roll neck will take place when the rolls are being changed or when the particular rolling mill stand is being dummied. In the past, the coupling box has been fastened to the roll neck by means of a set screw, or the like, engaging a groove in the roll neck. This is not only a type of connection that takes a long time to remove, but it is crude and leads to looseness and resultant noise. These and other difficulties experienced with the prior art devices have been obviated in a novel manner by the present invention.

It is, therefore, an outstanding object of the invention to provide a coupling for connecting a drive spindle with a roll neck, which coupling is rugged and dependable, inexpensive to manufacture, and requires a minimum of maintenance.

Another object of the present invention is the provision of a coupling for a rolling mill roll neck which coupling may be very quickly removed from the roll neck.

A still further object of this invention is the provision of a roll neck coupling which is quickly detachable and may be used with a roll neck of simple form so that the roll cost may be maintained at a minimum.

With these and other objects in view, as will be apparent to those skilled in the art, the invention resides in the combination of parts set forth in the specification and covered by the claims appended hereto.

The character of the invention, however, may be first understood by reference to certain of its structural forms as illustrated by the accompanying drawings in which:

Figure 1 is a a longitudinal sectional view of a rolling mill spindle and associated equipment embodying the principles of the present invention, Figure 2 is a sectional view of the invention taken on the lines II—II of Figure 1, and Figure 3 is a sectional view of the apparatus taken on the line III—III of Figure 1.

Referring first to Figure 1, wherein are best shown the general features of the invention, the coupling, indicated generally by the reference 10, is shown in use with the roll neck 11 of a rolling mill and one end of a spindle 12 which functions to drive the rolling mill. Another coupling 13 is associated with the other end of the spindle 12 and joins it to a pinion shaft 14. The coupling 10 and the coupling 13 are of the general type known as spherical gear couplings and are shown and described in the patent to Morgan No. 2,136,947. These couplings are capable of transmitting considerable amounts of power under relatively high degrees of misalignment. The coupling 13 is provided with a generally tubular coupling box 15, having a tapered bore 16 in which resides a similarly tapered pinion shaft 14. The pinion shaft is locked to the coupling box by means of a plate 17 and bolts 18 as well as the usual key arrangement. At its other end the coupling box 15 is provided with a cylindrical bore 19 in which is firmly mounted a sleeve 21. The internal surface of the sleeve 21 is formed with internal gear teeth 22 having a cylindrical pitch surface. A male coupling member 23 is fastened to the end of the spindle 12 and is provided with gear teeth 24. The gear teeth 24 have a spherical pitch surface of the same diameter as the pitch surface of the gear teeth 22 so that the male member 23 slides freely within the sleeve 21 and is capable of misalignment relative thereto. A hood 25 is fastened to the coupling box 15 and surrounds the shaft 12. A suitable seal 26 is interposed between the hood 25 and the spindle 12 in order to permit sliding of the spindle relative to the coupling box without loss of lubricant therefrom.

The coupling 10 at the other end of the spindle 12 is provided with a bore 27 having internal gear teeth 28 which mesh with spherical gear teeth 29 of a male member 31 firmly fastened to the end of the spindle. A cover member 32 is fastened to the coupling box and permits a small amount of longitudinal and angular movement of the male member and spindle relative to the coupling box without loss of lubricant from the bore 27. The teeth 29 have a spherical pitched surface while the teeth 28 have a cylindrical pitched surface so that the former are capable of considerable misalignment relative to the latter. Across the center of the bore 27 extends a wall 33 in which is centrally mounted a button 34 for a limiting engagement with the end of the spindle 12.

It will be noted that the coupling 10 comprises a housing 35 of a generally tubular conformation. The bore 27 is somewhat enlarged at the end which receives the spindle 12 and is provided with a reduced portion 36 which receives the roll neck 11. The roll neck is of a generally cylindrical form but is provided with opposed parallel flats 37 and 38. The reduced portion 36 of the bore 27 is also of a generally cylindrical conformation to receive the cylindrical portion of the roll neck. The reduced portion 36 is also provided with laterally extending pockets 39 and 41 in which reside slippers 42 and 43. The slippers are a generally rectangular cross-section and have plane surfaces which engage the flats 37 and 38 of the roll neck. Bolts 44 and 45 pass through apertures in the housing 35 and are screwed into the slippers 42 and 43 to hold them in place.

At a position considerably removed from the end of the roll neck its surface is formed with grooves 46 and 47. The grooves are formed with a center line which lies in a plane at right angles to the axis of the roll neck. Each groove extends from one flat 37 to the flat 38 and is of a generally rectangular cross-sectional form. Attached to the roll end of the housing 35 of the coupling is a locking member 48 having a generally washer-like form. The outside diameter of the locking member is the same as that of the housing 35 so that they form a continuous cylindrical unit. Through the washer extend two slots 49 and 51 which are of arcuate form having their centers of curvature on the center line of the roll neck. At each end of each slot is formed a counterbore such as the counterbore 52 of the slot 49. The counterbore is of generally frusto-conical form and is intended to lock a bolt in place. Bolts 53 and 54 extend through the slots and are threaded into the end of the housing 35. The heads of the bolts 53 and 54 are formed with a frusto-conical undersurface to engage with the counterbores formed at the ends of the slots. Sockets similar to the socket 55 are formed in the outer surface of the locking member for engagement by a spanner wrench. The locking member is provided with a cylindrical inner surface 56 which is slightly larger than the cylindrical surface of the roll neck. Extending inwardly from this surface are two ribs 57 and 58. These ribs are located so that their center lines are in the same plane as the center lines of the grooves 46 and 47 and, furthermore, they have a cross sectional shape similar to that of the grooves. Each rib has an inner cylindrical surface which conforms closely with the cylindrical surface forming the bottom of each of the grooves. It should be noted that the grooves 46 and 47 each subtend approximately ninety degrees of the circumference of the roll neck; the ribs 57 and 58 are forms subtend substantially the same proportion of the circumference of the locking member. The slots 49 and 51, however, are formed to subtend about thirty-five degrees of the circumference of the locking member. Furthermore, the arcuate slots 49 and 51 are located so that when the locking member is rotated about the axis of the roll neck, so that the bolts 53 and 54 reach the ends of the slots 49 and 51 and reside in the counterbores provided therein, the ribs 57 and 58 extend about half way through the grooves 46 and 47, respectively, as is shown in Figure 3. When the locking member is rotated in the other direction and the bolts 53 and 54 reside in the counterbores provided in the opposite ends of the slots 49 and 51, respectively, the ribs 57 and 58 do not reside in the grooves at all, but lie laterally of the slots 38 and 37, respectively.

The operation of the invention will now be readily understood in view of the above description. During the operation of the rolling mill, power enters the system through the pinion shaft 14, is transmitted through the coupling 13 to the spindle 12, and is transmitted from the spindle 12 through the coupling 10 to the roll neck 11. Since the couplings 10 and 13 are of the spherical gear type they are capable of transmitting considerable amounts of power despite appreciable misalignment. This misalignment would come about because of the fact that, although the pinion shaft 14 remains on a fixed axis the axis of the roll neck, the distance between the axes of the roll necks may vary considerably, depending on the diameter of the roll, the thickness of the matter being rolled, and other factors. At certain times, however, it is desirable to disconnect the spindle 12 from the roll neck 11 and to perform this action quite quickly. The best way to do this is to remove the coupling 10 from the roll neck 11 so that couplings and spindle remains as a unit. It is desirable to remove the couplings from the roll neck, for instance, when the roll is to be dummied, i.e. when the mill is operating and the particular roll stand involved does not take part in the rolling process. It is desirable also to remove the coupling from the roll neck when one wishes to change rolls. In order to do this, of course, the mill first be stopped so that the elements of the combination are not rotating. When this is done the bolts 53 and 54 are loosened sufficiently to clear their counterbores. The locking member 48 is then rotated clockwise, as shown in Figure 3, until the bolts 53 and 54 reside in the opposite ends of the slots 49 and 51, respectively. At that time the ribs 57 and 58 are free of the grooves 46 and 47, respectively, and reside adjacent the flats 38 and 37. The rotation of the locking member may take place by placing a spanner wrench thereacross and making use of the sockets 55. In this condition the coupling is free to be withdrawn axially from the roll neck, this being possible because of the sliding movement of the head 23 of the coupling 13 in the interior of the sleeve 21. When the coupling has been withdrawn axially from the roll neck sufficiently to be clear of the spindle, the couplings and spindle are usually supported by a separate apparatus, not shown. When it is desired to reconnect the drive to the roll neck, the coupling is slid axially along the roll neck until the button 34 contacts the end of the roll neck. In this condition, the ribs of the locking member will be in the general plane of the grooves 46 and 47. Then, the locking member is rotated counterclockwise so that the ribs 57 and 58 enter the grooves 46 and 47, respectively, and rotation is continued until the bolts 53 and 54 reside in the ends of the slots 49 and 51 respectively. At that time the ribs extend approximately half way across the grooves. Because use is made of only about one-half of the groove, it is possible to use a slot of fairly short length, thus maintaining the locking member as a fairly strong mechanical structure. This amount of interengagement of the ribs with the grooves is sufficient for most purposes to lock the coupling and its associated equipment to the roll neck.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed is new and desired to secure by Letters Patent is:

1. A coupling for joining a spindle to a roll neck, the roll neck being formed with opposed parallel flats, grooves formed in the surface of the roll neck having their center lines lying in a plane perpendicular to its axis, the grooves extending from one flat to another, comprising a coupling box of generally tubular conformation, means connecting the spindle to one end of the box for universal movement relative thereto, a locking member mounted on the box and having opposed ribs extending inwardly of the box in the general plane perpendicular to its axis, the locking member fastened to the coupling box so as to be capable of limited rotative movement relative thereto but so as to be normally incapable of removal therefrom, said locking member being capable of rotative movement from a first position to a second position relative to the roll neck, the said ribs being so located and of such a size and shape that they lie adjacent the flats in the said first position and each rib lies in a groove in the said second position, and arcuate slots formed in the locking member and engageable with bolts threaded in the coupling box for locking the box and the locking member against rotative movement when the latter is in the said second position.

2. A coupling for joining a spindle to a roll neck, the roll neck being formed with opposed parallel flats, grooves formed in the surface of the roll neck and having their center lines lying in a plane perpendicular to its axis, the grooves extending from one flat to another, comprising a coupling box of generally tubular conformation, means connecting the spindle to one end of the box for universal movement relative thereto, flat slippers associated with the coupling box and normally engageable with the flats of the roll neck to prevent rotative movement of the coupling box relative to the roll neck, a locking member mounted on the box and having opposed ribs extending inwardly of the box in the general plane perpendicular to its axis, a locking member fastened to the coupling box so as to be capable of limited rotative movement relative thereto but so as to be normally incapable of removal therefrom, said locking member being capable of rotative movement from a first position to a second position relative to the roll neck, the said ribs being so located and of such a size and shape that they lie adjacent the flats free of the grooves in the said first position and a substantial portion of each rib lies in a groove in the said second position, and means for locking the box and the locking member against relative rotative movement when the latter is in the said second position.

3. A coupling for joining a spindle to a roll neck, the roll neck being formed with opposed parallel flats, grooves formed in the surface of the roll neck having their center lines lying in a plane perpendicular to its axis, the grooves extending from one flat to another, comprising a coupling box of generally tubular conformation, the spindle having a head with a gear of spherical pitch surface engageable with an internal gear of cylindrical pitch surface formed in one end of the box for universal movement relative thereto, a locking member mounted on the box having opposed ribs extending inwardly of the box in a general plane perpendicular to its axis, the locking member being fastened to the coupling box so as to be capable of limited rotative movement relative thereto but so as to be normally incapable of removal therefrom, said locking member being capable of rotative movement from a first position to a second position relative to the roll neck, the said ribs being so located and of such a size and shape that they lie adjacent the flats in the said first position and each rib lies in a groove in the said second position, and arcuate slots formed in the locking member and engageable with bolts threaded in the coupling box for locking the box and the locking member against rotative movement when the latter is in the said second position.

4. A coupling for joining a spindle to a roll neck, the roll neck being formed with opposed parallel flats, grooves formed in the surface of the roll neck having their center lines lying in a plane perpendicular to its axis, the grooves extending from one flat to another, comprising a coupling box of generally tubular conformation, means for connecting the spindle to one end of the box for universal movement relative thereto, flat slippers associated with the coupling box and normally engageable with the flats of the roll neck to prevent rotative movement of the coupling box relative to the roll neck, a locking member mounted on the box and having opposed ribs extending inwardly of the box in a general plane perpendicular to its axis, the locking member being fastened to the coupling box so as to be capable of limited rotative movement relative thereto but so as to be normally incapable of removal therefrom, said locking member being capable of rotative movement from a first position to a second position relative to the roll neck, the said ribs being so located and of such a size and shape that they lie adjacent the flats and free of the grooves in the said first postion and a substantial portion of each rib lies in a groove in the said second position, and arcuate slots formed in the locking member and engageable with bolts threaded in the coupling box for locking the box and the locking member against rotative movement when the latter is in the said second position.

5. A coupling for joining a spindle to a roll neck, the roll neck being formed with opposed parallel flats, grooves formed in the surface of the roll neck and having their center lines lying in a plane perpendicular to its axis, the grooves extending from one flat to another, comprising a coupling box of generally tubular conformation, the spindle having a head with a gear of spherical pitch surface engageable with an internal gear of cylindrical pitch surface formed in one end of the box for universal movement relative thereto, flat slippers associated with the coupling box and normally engageable with the flats of the roll neck to prevent rotative movement of the coupling box relative to the roll neck, a locking member mounted on the box and having opposed ribs extending inwardly of the box in a general plane perpendicular to its axis, the locking member being fastened to the coupling box so as to be capable of limited rotative movement relative thereto but so as to be normally incapable of removal therefrom, said locking member being capable of rotative movement from a first position to a second position relative to the roll neck, the said ribs being so located and of such a size and shape that they lie adjacent the flats free of the grooves in said first position and a substantial portion of each rib lies in a groove in the said second position, and means for locking the box and the locking member against rotative movement when the latter is in the said second position.

6. A coupling for joining a spindle to a roll neck, the roll neck being formed with opposed parallel flats, grooves formed in the surface of the roll neck having their center lines lying in a plane perpendicular to its axis, the grooves extending from one flat to another, comprising a coupling box of generally tubular conformation, a spindle having a head with a gear of spherical pitch surface engageable with an integral gear of cylindrical pitch surface formed in one end of the box for universal movement relative thereto, flat slippers associated with the coupling box and normally engageable with the box of the roll neck to prevent rotative movement of the coupling box relative to the roll neck, a locking member mounted on the box and having opposed ribs extending inwardly of the box in a general plane perpendicular to its axis, a locking member fastened to the coupling box so as to be capable of limited rotative movement relative thereto but so as to be normally incapable of removal therefrom, said locking member being capable of rotative movement from a first position to a second position relative to the roll neck, the ribs being so located and of such a size and shape that they lie adjacent the flats and free of the grooves in the said first position and a substantial portion of each rib lies in a groove in the said second position, and arcuate slots formed in the locking member and engageable with bolts threaded in the coupling box for locking the box and the locking member against rotative movement when the latter is in the said second position.

7. A coupling for joining a spindle to a roll neck, the roll neck being formed with at least one flat, at least one groove formed in the surface of the roll neck having its center line lying in a plane perpendicular to its axis, the groove extending from the flat a substantial distance, comprising a coupling box of generally tubular conformation, means connecting the spindle to one end of the box for universal movement relative thereto, a locking member mounted on the box and having a rib extending inwardly of the box in a general plane perpendicular to its axis, the locking member being fastened to the coupling box so as to be capable of limited rotative movement relative thereto but so as to be normally incapable of removal therefrom, said locking member being capable of rotative movement from a first position to a second position relative to the roll neck, the said rib being so located and of such a size and shape that it lies adjacent the flat in the said first position and at least a portion of the rib lies in the groove in the said second position, and arcuate slots formed in the locking member and engageable with a fastener attached to the coupling box for locking the box and the locking member against rotative movement when the latter is in the said second position.

References Cited in the file of this patent

UNITED STATES PATENTS

| | | |
|---|---|---|
| 2,365,772 | O'Malley | Dec. 26, 1944 |
| 2,386,630 | O'Malley | Oct. 9, 1945 |
| 2,525,695 | Lombard | Oct. 10, 1950 |
| 2,769,323 | O'Malley | Nov. 6, 1956 |

FOREIGN PATENTS

| | | |
|---|---|---|
| 1,023,399 | France | Dec. 24, 1950 |